Jan. 6, 1959 M. CAMRAS 2,867,692

MAGNETIC RECORD DUPLICATING DEVICE FOR PRODUCING MAGNETIC RECORDS

Filed Dec. 22, 1952 3 Sheets-Sheet 1

Inventor
Marvin Camras by The Firm of Charles F. Hill Attys

Inventor
Marvin Camras
by The Firm of Charles Hill Attys

Jan. 6, 1959

M. CAMRAS

MAGNETIC RECORD DUPLICATING DEVICE FOR PRODUCING MAGNETIC RECORDS 2,867,692

Filed Dec. 22, 1952

3 Sheets-Sheet 3

Inventor
Marvin Camras
by The Firm of Charles W. Hills
Attys.

United States Patent Office 2,867,692

Patented Jan. 6, 1959

2,867,692

MAGNETIC RECORD DUPLICATING DEVICE FOR PRODUCING MAGNETIC RECORDS

Marvin Camras, Chicago, Ill., assignor to Armour Research Foundation of Illinois Institute of Technology, Chicago, Ill., a corporation of Illinois Application December 22, 1952, Serial No. 327,268

11 Claims. (Cl. 179—100.2)

The invention relates to a magnetic record duplicator and a method of duplicating magnetic records and more particularly to a device and method of bulk duplication of magnetic records whereby a magnetic pattern is transferred from a master magnetic record medium to a magnetizable copy medium.

The present subject matter constitutes a continuation-in-part of that disclosed in my copending application Serial No. 60,653, filed November 18, 1948, and a continuation-in-part of my application Serial No. 58,403, filed November 5, 1948. As is well known to those versed in the art, one of the most notable methods of magnetic record and one which has been attended by remarkable commercial success, is the method of magnetic recording whereby a lengthy record medium is drawn across an electromagnetic transducer head assembly and is subjected to a magnetic field varying in accordance with time variations of an intelligence, thereby imparting magnetization to incremental lengths of the medium in accordance with the time variations of the intelligence.

Alternative methods of magnetic recording utilize a disk or plate-like record medium as well as a sheet-like medium which may be coiled or rolled into a cylindrical form. When employing the disk or plate-like record medium a transducer head assembly is moved over the surface of the medium along circular or linear grooves in the medium, or the medium is rotated or otherwise moved under the transducer head. In that instance the head assembly includes a magnetic core member having a non-magnetic gap which is positioned in proximity to the record medium and has suitable current conducting exciting elements to produce a magnetic field across the gap.

When employing a sheet-like medium which has been or may be coiled or rolled into a cylindrical form the apparatus employed is substantially similar to that employed in recording on a disk or plate-like record medium. Usually however, in this instance the cylindrical form is rotated about its major axis and the head assembly is assembled to slowly traverse the length of the cylinder, thereby forming a helical pattern on the cylindrical form record.

Upon completion of the recording on the cylindrical form sheet the sheet may be unrolled or uncoiled and disposed of as desired in accordance with the character of the material of the sheet: if the base material of the sheet is paper or some other flexible, foldable material, it may be folded and put in an envelope and mailed or filed, etc.

During the recording operation, current is caused to flow in the exciting elements in the transducer head in accordance with the time variations of an intelligence to produce a time-varying magnetic field in the core in accordance with the value thereof. The record medium is subjected to the influence of this field as relative movement between the transucer head and the medium occurs, the magnetization is imparted to incremental lengths of the medium in accordance with the time variations of the intelligence, thus causing variations in the magnetization of the medium along the length of a predetermined path in accordance with the time variations of the intelligence.

During reproduction of the intelligence, or monitoring thereof, the record medium is subjected to relative movement in connection with a similar head assembly to set up a flux in the core portion thereof in accordance with the magnetization of the medium along successive incremental lengths of the predetermined path as the gap of the magnetic core member moves in proximity to the magnetized path. The resulting time-varying flux induces voltage in the core with which the flux is linked in accordance with the time rate of change thereof. This voltage may be amplified and suitably reproduced by loud speaker or a similar device to produce the intelligence recorded.

Duplication of these magnetic records for divers purposes has heretofore been time consuming and difficult as the complexity of the devices heretofore known have either failed to properly and precisely reproduce and duplicate these records or have had other inherent difficulties which render magnetic record duplication difficult and expensive.

A duplicating device constructed in accordance with my invention utilizes the characteristics of any magnetizable medium which has been suitably magnetized in accordance with the time variations of a given intelligence, to influence a duplicate magnetizable medium of substantially the same or similar dimensions as that of the first magnetizable medium, thereby imparting a similar magnetization to the duplicate medium, similarly, the method of duplication of the intelligence signals recorded on a magnetizable record medium in accordance with my invention utilizes a magnetizable record medium which has been properly magnetized in accordance with the time variations of any given intelligence to influence a duplicate magnetizable medium of substantially similar dimensions to that of the intelligence carrying magnetizable record medium thereby imparting a similar magnetization to the duplicate medium.

Thus, it is an object of my invention to provide a device for producing duplicate copies of a master magnetic record where the master record medium is a magnetizable material and the blank used for the duplicate copy is made of a material capable of being magnetized.

Another object of my invention is to provide a device for bulk duplication of a magnetic pattern previously provided on a master magnetic record medium.

It is another object of my invention to provide a method for producing duplicate copies, in bulk, of a master magnetic record by assemblying a master magnetic record medium and a magnetizable copy medium in close engaging contact over the entire area of the recorded intelligence signals on the master magnetic medium, supplying an electromagnetic transfer field to the assembled media and thereby magnetize the copy medium in accordance with the time-varying magnetic pattern of the intelligence recorded on the master magnetic record medium.

It is another object of my invention to provide a method for bulk duplication of an entire intelligence, time-varying magnetic pattern on a master magnetic record medium to a magnetizable copy medium by assembling the media in close engaging contact over the entire area of the recorded intelligence on the master magnetic record medium and subjecting successive portions of the assembled media to an electromagnetic transfer field of varying intensity with respect to the assembled media to thereby duplicate the magnetic pattern on the master magnetic record medium on the copy magnetizable medium.

It is another object of my invention to provide a method and a device for reproducing duplicate copies of a master disk magnetic record on a magnetizable disk copy medium.

It is another object of my invention to provide a method and a device for producing record copies of the intelligence, time-varied magnetic pattern on a magnetized master disk by placing a magnetizable blank disk in contact with the magnetized master disk.

A further object of my invention is to provide a method and a device for producing magnetic sound record duplicates from a master magnetic sound recording by a contact process.

A further object of my invention is to provide a device and a method for simultaneously duplicating a plurality of magnetic patterns appearing on a single master magnetic record medium on a blank magnetizable record medium.

A still further object of my invention is to provide a method and a device for producing magnetic record copies on different master magnetic records successively by passing successive assemblies of a master magnetic record and a magnetizable copy medium placed in close engaging contact through an electromagnetic transfer field.

A still further object of my invention is to transfer a magnetic pattern from a master magnetic record medium having a high coercive force to a magnetizable copy medium having a comparative lower coercive force by placing the media in contact with an alternating current magnetic transfer field.

A still further object of my invention is to transfer a magnetic pattern from a magnetized master disk to a magnetizable copy medium by rotating the master disk and said copy medium through a magnetic transfer field.

A still further object of my invention is to provide a method and a device for transferring magnetic patterns through the use of a magnetic transfer field which is varied in accordance with predetermined parameters.

A still further object of my invention is to provide a method and a device for transferring magnetic patterns from a sheet-like master magnetic medium to a sheet-like copy magnetic medium.

A still further object of my invention is to provide a method and a device for transferring a magnetic pattern from a lengthy master magnetic record medium of tape-like configuration to a magnetizable copy medium of similar configuration.

A still further object of my invention is to provide a method and device for transferring an entire magnetic pattern from a master magnetic medium of predetermined dimensions to a copy magnetic medium of substantially similar dimensions by placing the two media in close engaging contact throughout their dimensions and subjecting the still assembled media to a transfer field varied in accordance with predetermined parameters.

Other and further features and objects of my invention will become apparent to those skilled in the art through reference to the following detailed description and the appended drawings in which I have described the manner of construction, organization and method of operation of the selected embodiments of my invention, and illustrated them, respectively, and in which like reference numerals refer to like parts, and in which.

Figures 1, 2, 3, 4:
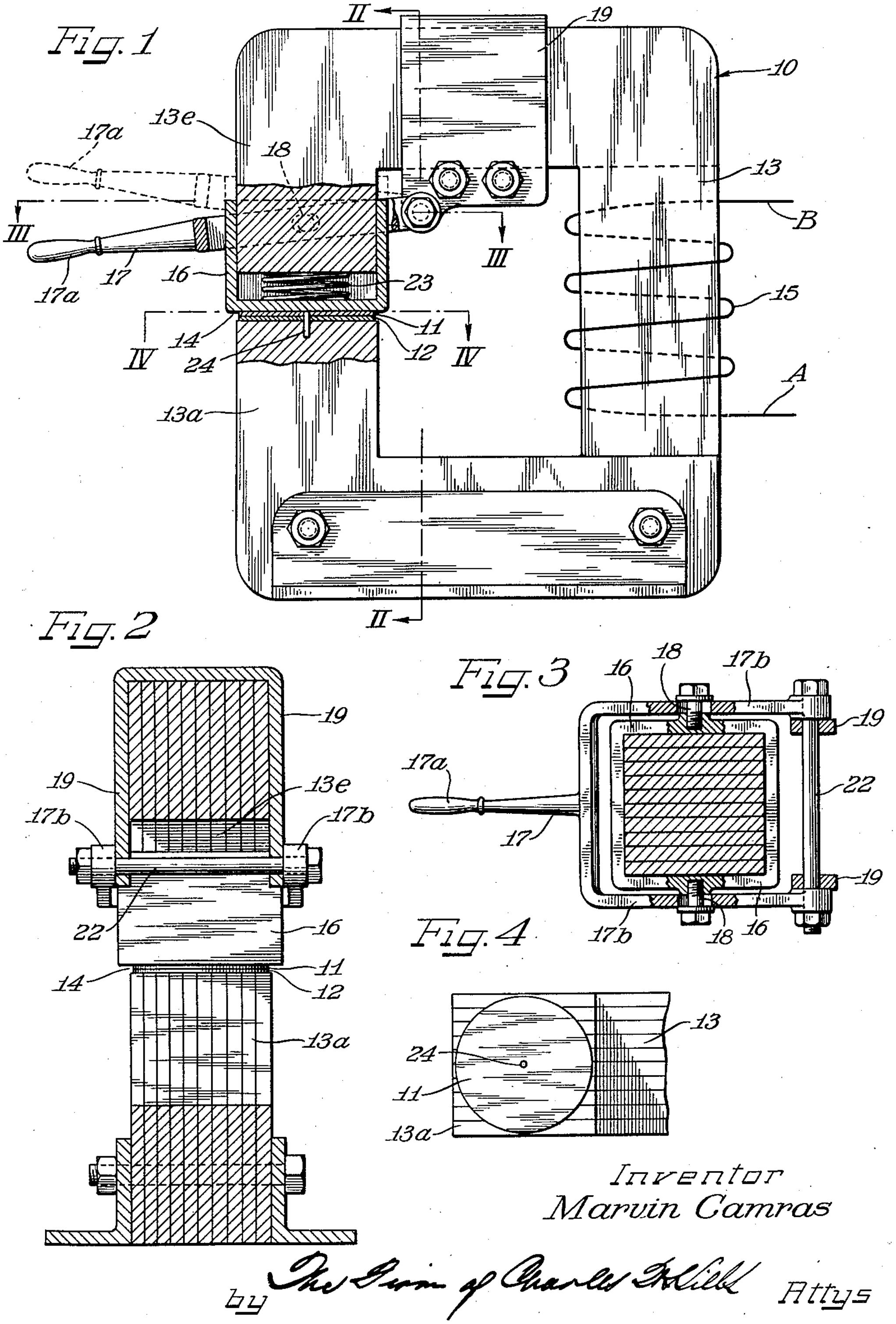
Figure 1 is a side elevational view, partly in section, showing a duplicating device embodying the principles of my invention.
Figure 2 is a sectional elevational view of the embodiment shown in Figure 1 taken along the line II—II of Figure 1.
Figure 3 is a partial section plan view of the embodiment of my invention illustrated in Figure 1 and taken along the line III—III of Figure 1.
Figure 4 is a partial sectional plan view of the embodiment illustrated in Figure 1 and taken along the line IV—IV of Figure 1.

Referring to Figure 1, a magnetic record duplicator 10 is shown transferring a magnetic pattern from a master magnetic record 11 to a paramagnetic copy record medium 12.

The duplicator 10 is provided with an iron core 13 having opposed legs 13*a*, 13*e* separated by an air gap 14. A coil 15 is wound around the iron core 13 and may be energized through a pair of wire leads A and B with a selected excitation current to produce an A. C. or D. C. magnetic transfer field in the area of the air gap 14. The iron core 13 may be of laminated construction, as may clearly be seen in Figure 2, to reduce losses attendant upon the use of an alternating excitation current.

The master magnet record 11 and the copy medium 12 are held in intimate contact with one another within the magnetic transfer field by an adjustable spring press assembly comprising a sleeve 16 which fits in sliding engagement around the upper leg 13*e* and which may be reciprocated by a lever arm 17 having a handle 17*a* and a yoke 17*b* (Figure 3). The sleeve 16 is connected to the lever arm 17 by a pair of pins 18 which pass through the elongated slots formed in the yoke 17*b* and are threadedly engaged in the sleeve walls.

The lever arm 17 may be pivotally connected to the core structure in a conventional manner. The pivot assembly is herewith shown as comprising a U-shaped frame member 19 which is positioned in firm assembly with the upper portion of the core 13 by a pair of draw bolts 21. A third draw bolt 22 for pivotally supporting the end of the lever arm 17 passes through opposite legs of the frame 19 and permits the lever arm 17, which is mounted thereon, to oscillate about a pivotal axis.

A coil spring 23 or other suitable resilient member may be interposed between the sleeve 16 and the upper leg 13*e* fitting within the sleeve to provide resilient engagement of the sleeve 16 with the record media (Figure 1). The lower leg 13*a* may be fitted with a locating pin 24 (Figures 1 and 4) to facilitate centering the magnetic record media in the duplicator when, from the character of the record media, it is desirable to do so. Any other form of jig insuring proper alignment of the master record and the copy may be employed as found expedient. The leg 13*a* may further be equipped with a non-magnetic pad material (not shown) such as felt or the like to insure intimate contact between the resiliently compressed record media.

The master record 11 is preferably made of material having high coercive force ($H_c$) in the range of 750-1,000 oersteds, so that the master will not be adversely affected by an A. C. transfer field. The master record 11 should also have a sufficiently high retentivity value ($B_r$) so as to permit complete magnetization of the copy medium 12.

Master records having these favorable characteristics may be produced by using a flat plate, sheet, tape or disk made of "Alnico" which has been ground and polished. Satisfactory records are also produced by coating a backing material of any desired character with magnetic material having the aforementioned desirable characteristics.

Any selected magnetization, for example, a pattern corresponding to the time variations of a selected intelligence, is imparted to the master in the usual manner. Before using the master for producing duplicate records, it is highly desirable that the magnetized master record be subjected to an A. C. magnetic field for the purpose of "aging." A field of proper quantitative strength for "aging" is approximately equal to the additive value of the A. C. transfer field plus the field induced in the copy material. It has been found that this precautionary step of "aging" stabilizes the characteristics of the master record and operates to prevent smudging of the master magnetic pattern in the case of inadvertent relative slippage between the copy and the master while they are in the presence of the magnetic transfer field.

The duplicating device 10 shown in Figures 1 through 4 illustrates the use of a separarte master record 11 and a sleeve 16; however, it should be understood that a master disk, sheet, or plate of the character described normally would be incorporated directly into the press means, for example, as the bottom member of the sleeve 16, thereby facilitating mass production of magnetic record copies.

The copy medium 12 is formed of any suitable matrial and should have a coercive force comparratively lower than the master record, however, the coercive force is preferably high enough (in the range of 200-300 oersteds) and retentivity value ($B_r$) should be high enough to give satisfactory output and frequency response when the duplicate copy record is played back in a magnetic record reproduction unit. Satisfactory records may be made with copy material having a coercive force as low as 100 oersteds.

It is also desirable that the copy medium 12 be of low permeability so as to permit a high percentage of the magnetic field present in the master record to pass through the copy material when they are in intimate contact with one another within the magnetic transfer field.

To operate the duplicating device 10, the copy medium 12 is centered on the locating pin 24, and the master record 11 is positioned above the copy, either by attachment to the sleeve 16 or by centering the master record on the pin 24. The handle 17 is then reciprocated downwardly, thereby engaging the record media and compressing them into intimate contact with one another. The coil 15 is energized with an A. C. cyclic current, which, in the course of the reproduction process, is maintained at a predetermined maximum value and then reduced to zero in such a manner as to produce a decaying magnetic transfer field in the area of the air gap 14. In connection with the energization of the coil 15, means are used to produce a decaying field which decays over a considerable number of cycles. One form of decaying means that may be employed is that schematically illustrated in Figure 10.

The quantitative strength of the transfer field should preferably lie at approximately one-half of the value of the coercive force ($H_c$) of the master record and between one and one-quarter to one and one-half times the coercive force ($H_c$) of the copy material or less.

The vectorial summation of the magnetic field of the master magnetic record permeating the copy medium and the fluctuating magnetic transfer field results in a residual magnetization of the copy medium which is linearly proportional to the magnetization of the master record, thereby producing a duplicate magnetic record which is a faithful reproduction and which is free of distortion.

The duplicating process may be repeated ad infinitum inasmuch as a properly aged master record of the type described will not deteriorate in field strength despite repeated exposures to magnetic transfer fields.

An alternative method of operation may be pursued if the copy medium 12 has previously been saturated with a D. C. magnetic field for the purpose of eliminating magnetic variations.

The coil 15 is then energized with D. C. current to establish a field in the air gap 14 in opposition to the saturation of the copy medium 12. Since the master and the copy are in intimate contact to permit the magnetization of the master to permeate the copy, the vectorial summation of the saturation magnetization of the copy medium, the magnetization of the master record, and the magnetic transfer field produces a resultant magnetic pattern in the copy medium corresponding to the pattern of the master magnetic record. This residual magnetization is linearly proportional to the magnetization of the master record and is a faithful reproduction thereof.

Figures 7, 8, 9:
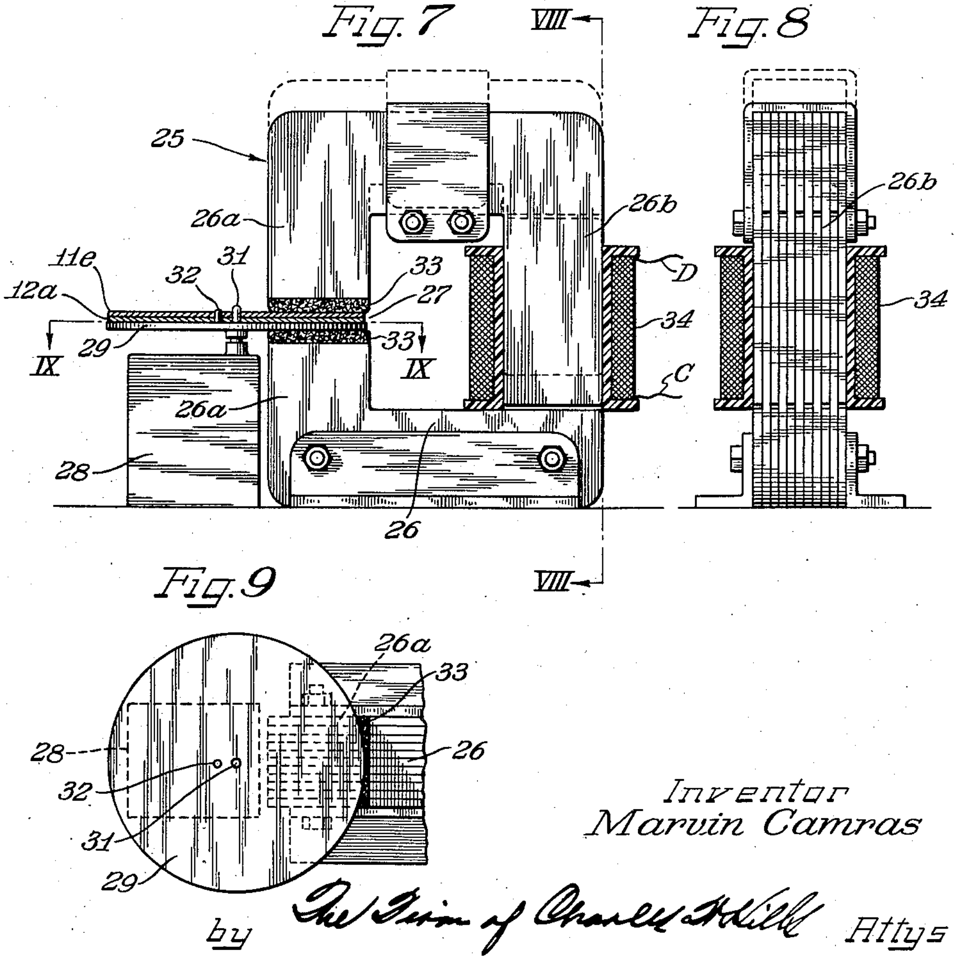
Figure 7 is a side elevational view, partly in section, showing a modified duplicating device incorporating the principles of my invention.
Figure 8 is a sectional view of the embodiment illustrated in Figure 7 and taken along the line VIII—VIII of Figure 7.
Figure 9 is a partial sectional plan view of the embodiment of my invention illustrated in Figure 7 and taken along the line IX—IX of Figure 7.

If large disks, sheets, coiled tapes or plates are used as record media, it will be apparent that the duplicating device 10 will necessitate a cumbersome structure, and the media themselves may be extremely unwieldy. A modified duplicator device 25 is shown in Figures 7, 8 and 9 which overcomes these difficulties.

The duplicator 25 may include a transfer magnet 26 having a laminated iron core with opposing legs **26*a* separated by an air gap 27. The yoke 26*b* of the transfer magnet 26 may be suitably equipped with interleaving laminations, thereby permitting collapsible reciprocation to and from the dotted line position indicated in Figures 7 and 8 as may be desired, for example, when the record media are to be loaded and unloaded into the duplicator device. It will be understood that the core structure may also include suitable spring press means for adjustable resilient engagement of the legs 26*a*** with any objects placed therebetween.

Adjacent the legs **26*a* is a pedestal 28 having assembled therewith a suitably powered turntable 29. The turntable 29 may have a central locating pin 31 and a drive pin 32** as one form of suitable means for aligning and driving the media.

A master magnetic record **11*a* and a magnetizable copy medium 12*a* are centered on locating pin 31 of the turntable 29 and are rotated with the turntable as a unit by drive pin 32**.

Non-magnetic pad members 33 may be affixed to the opposing legs **26*a* of the transfer magnet 26** to insure an intimate contact of the record media.

A coil 34 is wound around the transfer magnet 26 and may be energized through a pair of wire leads C and D with a selected excitation current to produce an A. C. or D. C. magnetic transfer field in the area of the air gap 27.

If the copy medium is a demagnetized blank and a so-called A. C. method is to be followed, the magnetic field of the master record **11*a* permeates the copy medium 12*a* as the media are pressed into contact with one another. When the coil 34 is energized with A. C. cyclic current, a magnetic transfer field is produced which is maintained at a predetermined maximum value long enough to permit the record media to rotate with the turntable 29** through a sufficient arc to have the entire record media pass through the transfer field. The magnetic transfer field is then reduced to zero in intensity at the assembled media in such a manner as to produce a decaying magnetic field which decays over a considerable number of cycles. It may be desirable to bring the magnetic transfer field up to its initial predetermined maximum value slowly, although such procedure is not as necessary as it is to cause the field to decay over a number of cycles after subjection of the record media to the transfer field. This may be accomplished either by varying the intensity of the field directly or by varying the position of the media with respect to the field.

The vectorial summation of the various field components results in a residual magnetization in the copy medium which is linearly proportional to the magnetization of the master, thereby producing a duplicate magnetic record free of distortion and a faithful reproduction of the original.

If the so-called D. C. method is to be followed, the procedure is as follows. The copy medium is magnetized to produce a saturation magnetization. The contacted master record 11*a* and copy medium 12*a* are rotated with the turntable 29 and are subjected to a D. C. transfer field preferably in opposition to the saturation of the copy medium. The vectorial summation of the various field components results in a residual magnetization in the copy medium as before.

Another method of accomplishing the duplication processes herein described is to provide the pedestal 28 with suitable means for movement relative to the transfer magnet 26. Thus, the transfer field may be maintained at the predetermined maximum value and the rotating record media are moved inwardly and outwardly so as to subject their entire areas to the effects of the magnetic transfer field. It will be evident that after the entire area of the record media has been subjected to the transfer field, the pedestal 28 may be moved away from the transfer magnet 26, thereby effectively moving the record media through a successively decreasing magnetic field. It will be apparent that this procedure permits the duplication of magnetic patterns with master records of a larger area than would ordinarily be covered by the span of the transfer magnet legs 26*a*.

It should also be noted that more than a single master record and a single copy medium can be placed in the magnetic transfer field. For example, a number of media or sets of media separated by non-magnetic spacers could be stacked and subjected to the magnetic transfer field in accordance with the procedures described.

Figures 5, 6:
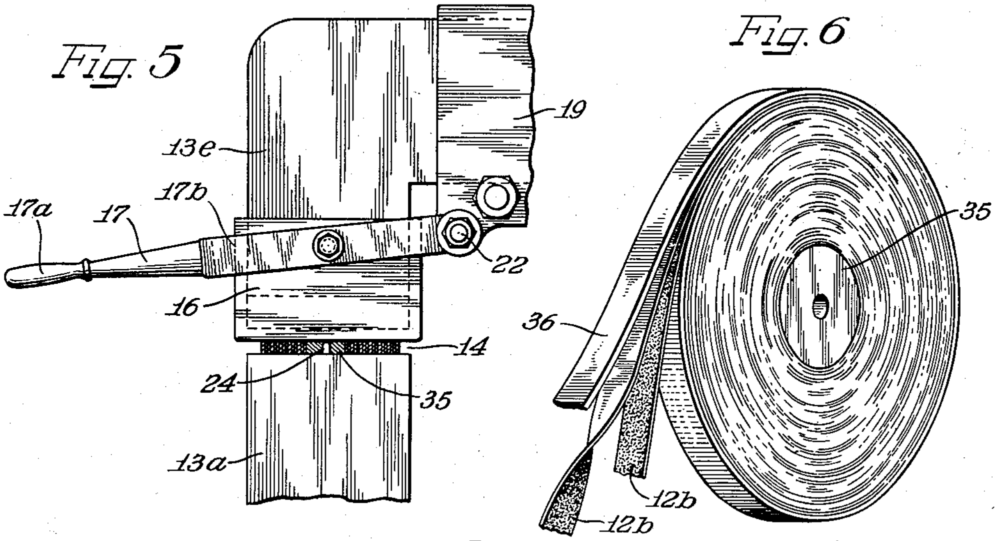
Figure 5 is a partial side elevational view of a device embodying the features of my invention and illustrating another embodiment thereof.
Figure 6 is a prospective view of a representative blank magnetizable record medium adapted for duplication in a device in accordance with the principles of the present invention.

Figures 5 and 6 show how lengthy magnetizable record media may be reproduced in a duplicating device incorporating the principles of the present invention.

Referring specifically to Figure 6, a lengthy master magnetic record 11*b* and a lengthy magnetizable copy medium 12*b* are shown coiled compactly about a non-magnetic spool 35. Successive layers of the record media are separated by a non-magnetic spacer member 36.

As may be seen in Figure 6, this particular embodiment shows the record media to be formed of coated backing material, hence, it should be noted that the coated faces of the master record 11*b* and the magnetizable copy medium 12*b* are placed in intimate contact with one another.

The coiled record media are placed, as a unit, into the air gap by centering the spool 35 upon the locating pin 24. The exciting elements of the duplicator device are then energized to produce the magnetic transfer field, thereby accomplishing a rapid transfer of the magnetic pattern from the master magnetic record 11*b* to the magnetizable copy medium 12*b*.

It will be understood, of course, that when it is desired to produce duplicate magnetic records with lengthy media, either the A. C. method or the D. C. method may be followed in accordance with the procedures described above.

Figure 10:
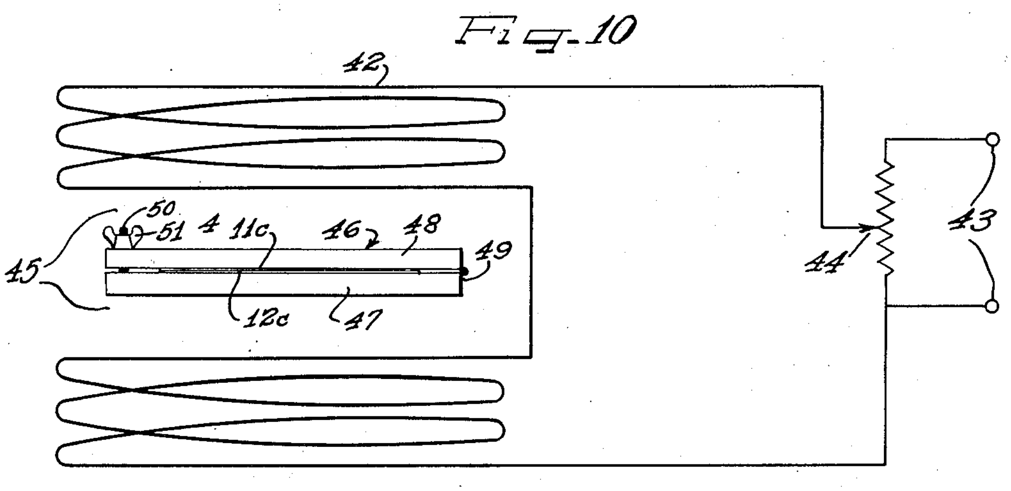
Figure 10 is a schematic representation illustrating still another embodiment of the principles of my invention.
Figures 11, 12, 13, 14:
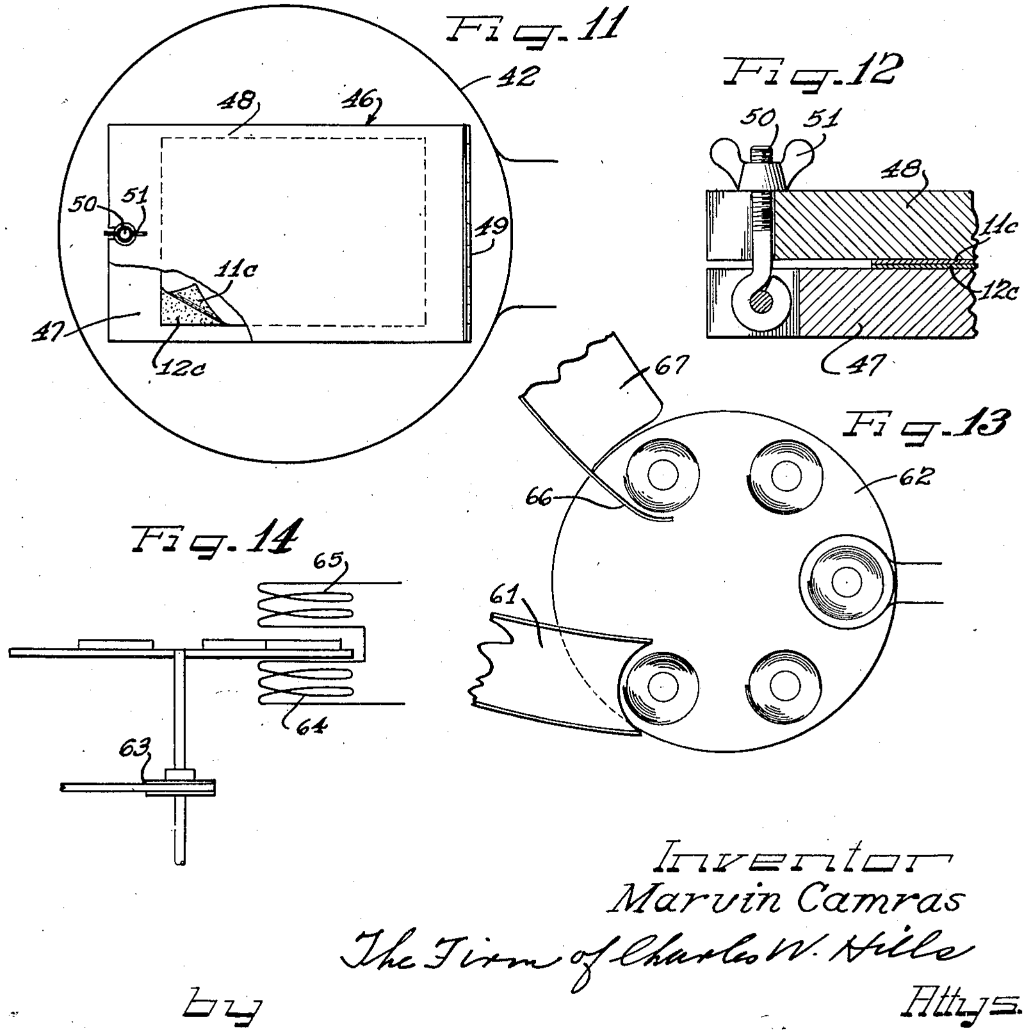
Figure 11 is a partial sectional plan view of the embodiment of my invention illustrated in Figure 10.
Figure 12 is a partial elevational view illustrating the clamping device employed in conjunction with the embodiment of my invention illustrated in Figure 10.
Figure 13 is a plan view of still another embodiment of my invention and illustrates one form of a mass production method and device employing the principles of my invention for the bulk duplication of magnetic records.
Figure 14 is a side elevational view of the embodiment of my invention illustrated in Figure 13.

In the embodiments hereinabove described an iron or other magnetic material core member was provided with an air gap between its poles and the assembled record media were situated between those poles and in that air gap. In Figures 10, 11 and 12 there is illustrated another device embodying the principles of my invention for duplication in bulk of magnetic records principally of the sheet form. However, this particular embodiment may be employed to transfer magnetic patterns from disks or plates or coiled tapes as well as from sheets when the desired master magnetic record medium is assembled with a copy magnetizable record medium, as previously described, with the media in close engagement throughout the area of the magnetic intelligence time-varied pattern on the master magnetic record medium.

In the embodiment illustrated in Figures 10, 11 and 12 a pair of air core coils 41, 42 connected in series aiding relation are supplied with a suitable current from a suitable source 43 through any convenient means for varying that current such as a potentiometer 44 to thereby generate a proper transfer field in the gap 45 between the lower coil 41 and the upper coil 42.

There is provided in the gap 45 between the coils 41 and 42 a clamping assembly 46 for properly aligning and holding the master magnetic record medium 11*c* and the copy magnetizable record medium 12*c* in close face-to-face engaging contact. This particular clamping assembly 46 having a lower plate 47 and an upper plate 48 of non-magnetic material and pivotally separable as by a hinge 49 and securable together in a clamping relation as by a swing bolt 50 having a quick set nut 51, is one form of clamping assembly which may be employed when record media of the sheet type are to be utilized.

With particular attention directed to Figure 11 it will be seen that the sheet like media 11*c* and 12*c* may be of any particular configuration desired and may be of any appropriate material. One suitable material or construction character would be one substantially identical to the tapes 11*b*, 12*b* of Figure 6. A suitable backing material such as paper or the like is properly coated on one of its faces with a magnetizable coating material adaptable for utilization in magnetic recording systems. The coating for the master magnetic record medium 11*c* should have the characteristics above described as desirable for master magnetic record media and the copy magnetic record media 12*c* should thus have those characteristics above described as most suitable for magnetizable copy record media.

For proper duplication with the device illustrated in Figures 10, 11 and 12 best results are obtained if the coils 41 and 42 each have a diameter substantially greater than the height of each coil and if each coil has a diameter substantially greater than the greatest dimension of the clamping assembly 46. Best results are obtained from this construction by virtue of the uniform density of the field in the area of the assembled record media and by virtue of the investment of the whole record media in the transfer fields provided through energization of the coils 41, 42.

In operation substantially the same considerations as those above described are of equal applicability here. The master magnetic record media with time-varying intelligence magnetic patterns imposed on the coating thereof is placed in face-to-face contact with a magnetizable copy medium coating on a sheet preferably of substantially like dimensions to that of the master record and they are clamped in then assembled condition in the clamping assembly 46 so that they are properly positioned with respect to the transfer field coils 41, 42. Thereafter the coils 41 and 42 are energized to provide a field of any desired character such as either of those disclosed above and the energization current is then reduced substantially to zero to reduce the field and thereby leave the copy medium with a magnetic impression substantially identically corresponding to the magnetic pattern on the master magnetic record medium.

Although this particular embodiment of my invention has been described with respect to employing a sheet media it should be understood that any other form of media properly assembled in face-to-face relation over the entire area of the record pattern on the master magnetic record medium may be employed. Also it should be understood that the clamping assembly described herein is merely one of convenience and not of necessity the only form of clamping assembly that may be employed.

A still further embodiment of my invention is illustrated in Figures 13 and 14. The device therein illustrated is one form of mass production system for successively copying various magnetic records in bulk.

In this form of my invention a chute 61 is provided for the record media assembled as hereinabove described and further described hereinbelow, to be conveyed to a turntable 62 which is rotated by any convenient means such as the belt and pulley means 63 illustrated.

As the assembled record media engage the turntable 62 and are positioned thereon in a predetermined manner by any convenient means, not shown, they are moved on the turnatble to an air gap between a pair of air core series aiding connected transfer field inducing coils 64 and 65 which are substantially similar to the coils 41 and 42 of Figure 10. These coils 64 and 65 have a diameter, when round, substantially greater than the height of each thereof and substantially greater than the longest dimension of the assembled record media. As the turntable 62 continues to rotate the assembled record media pass out from the air gap between the transfer field inducing coil to a point where they engage a pick-up arm 66 which transfers them off from the turntable 62 and onto a conveyor table 67 for disassembling.

The transfer field inducing coils 64 and 65 are energized from any suitable source in accordance with the hereinabove described requirements for such a source. In this particular assembly system it is not necessarily essential that the coils be provided with a means to vary them from a maximum energization level to zero to provide a field of decreasing strength since a field of decreasing strength is inherently provided to the assembled record media after they pass into the field, through the area of the field having maximum strength and successively out from the field to a region of substantially zero intensity.

As hereinabove described my invention relates generally to bulk magnetic pattern transfer whereby a magnetic pattern of time-varying intelligence bearing signals are impressed upon a master magnetic record medium which has been aged. Then a master magnetic record medium with this magnetic record thereupon is put in face-to-face contact with a copy magnetizable medium of generally the same physical construction, that is of generally the same dimensions so that when placed in face-to-face contact each with the other the entire surface of the master magnetic medium bearing the magnetic record will be covered with the copy magnetizable medium at once. And when still assembled this whole assembly is then subjected to a transfer field applied on or to the whole assembly at once or to successive increments thereof whereby as the field intensity at the assembly is decreased to substantially zero the magnetic pattern on the master magnetic record medium is copied on the copy magnetizable record medium.

Any form of master magnetic medium may be utilized in the present invention so long as a copy magnetic medium may be placed in face-to-face contact and in tight engaging contact therewith over substantially all of the area thereof carrying the magnetic pattern record.

It will be apparent to those skilled in the art that I have described methods and structures whereby predetermined magnetic patterns may be transferred or copied from master magnetic media to magnetizable copy material with great efficiency and rapidity, thereby making possible the production of copy duplicates of magnetic patterns in an economical and convenient manner.

While I have resorted to details in the description of my invention for the sake of clarity, it will, of course, be understood that any modifications with respect to the various details will suggest themselves to those versed in the art, and those modifications will not mark a departure from the true spirit of my invention. I desire to be limited, therefore, only by the scope of the appended claims and the prior art.

I claim as my invention:

1. A duplicating device for transferring a magnetic pattern from a master magnetic record to a paramagnetic copy record medium comprising, in combination, a wound core for producing a magnetic transfer field in and around an air gap defined by opposing legs of said core, a master magnetic record medium and a paramagnetic copy medium disposed in said gap, and means for holding said record media in said magnetic transfer field, said means including a lever arm pivotally connected to said core and a sleeve surrounding one of said opposing legs, said sleeve reciprocably assembled with said lever arm and operable to compress said media into contact with one another against the other of said opposing legs within said magnetic transfer field in said air gap.

2. A duplicating device for transferring a magnetic pattern from a master magnetic record to a paramagnetic copy record medium comprising, in combination, a wound core for producing a magnetic transfer field in and around an air gap defined by opposing legs of said core, a master magnetic record medium and a paramagnetic copy medium disposed with said gap, and press means for holding said record media in said magnetic transfer field, said press means including a reciprocable sleeve and resilient elements, said sleeve assembled around one of said opposing legs of said core, said resilient elements associated with said sleeve whereby said press means is selectively operable to resiliently engage said record media disposed within said air gap for producing intimate contact of said record media within said magnetic transfer field.

3. A duplicating device for transferring a magnetic pattern from a master magnetic record to a paramagnetic copy record medium comprising, in combination, excitation means having opposed legs producing a magnetic transfer field in and around an air gap, record media including a master magnetic record medium and a paramagnetic copy medium disposed in said gap, and press means for holding said record media in said magnetic transfer field, said press means including a reciprocable sleeve and resilient elements, said sleeve assembled around one of said opposing legs of said excitation means, said resilient elements associated with said sleeve whereby said press means is selectively operable to resiliently engage said record media inserted into said air gap for producing intimate contact of said record media within said magnetic transfer field, one of said legs having a locating pin and a non-magnetic backing pad for supporting said record media on the other of said opposing legs.

4. A duplicating device for duplicating a magnetic pattern from a master magnetic record into a paramagnetic copy record medium comprising, in combination, a wound iron core having opposing legs separated by an air gap establishing a magnetic sensitizing field in and around said air gap, and a turntable means adjacent said opposing legs and extending into said air gap for rotating selected record media through said magnetic sensitizing field, magnetic record media including a master magnetic record and a paramagnetic copy medium rotatable on said turntable and having portions thereof extending into said air gap, said iron core being vertically adjustable and consisting of interleaved laminated sections to permit collapsible vertical adjustment of said core for engagement of said opposing legs with the record media as they are rotated through said air gap by said turntable means.

5. A duplicating device for transferring a magnetic pattern from a master magnetic record onto a paramagnetic copy medium which comprises a core structure having opposed leg portions defining an air gap between said leg portions, means for establishing an electromagnetic field about said core, means for adjusting the effective width of said air gap, and a plurality of record members including a master magnetic record medium and a paramagnetic copy medium pressed together in said gap between said opposed leg portions.

6. A duplicating device for transferring a magnetic pattern from a master magnetic record to a paramagnetic copy medium which comprises a core structure having opposed leg portions defining an air gap between said leg portions, means for establishing an electromagnetic field about said core, means for moving one of said leg portions relatively to the other to change the effective width of said air gap, and a plurality of record media including a master magnetic record and a paramagnetic copy record medium pressed together in said gap between said opposed leg portions.

7. A duplicating device for duplicating a magnetic pattern from a master magnetic record onto a paramagnetic copy record medium comprising a wound core member having opposing legs separated by an air gap establishing a magnetic duplicating field in and around said air gap, a turntable means adjacent said opposing legs for rotating record media through said magnetic duplicating field, and a plurality of record media including a master magnetic record and a paramagnetic copy record disposed on said turntable means and having portions thereof in contact within said gap.

8. A duplicating device for transferring a magnetic pattern from a master magnetic record onto a paramagnetic copy medium which comprises a core structure having opposed leg portions defining an air gap between said leg portions, means for establishing an electromagnetic field about said core, a plurality of record members including a master magnetic record medium and a paramagnetic copy medium held together along the entire recorded surface of said master record, said master record having a lengthy magnetic pattern recorded thereon and arranged compactly for bulk duplications, said records when in pressed engagement extending at least partially within said gap between said opposed leg portions, and means for pressing said portions in said gap into firm contact with each other.

9. A device for producing duplicate magnetic patterns on a magnetizable copy medium from a magnetic pattern on a master magnetic record medium comprising a turntable, means for rotating said turntable, means for producing a magnetic transfer field across an air gap, said turntable operating to support a master magnetic record medium and a magnetizable copy medium in assembled face-to-face engagement throughout the entire region of the magnetic pattern on said master magnetic record medium and operating to support the so assembled media in the said air gap.

10. A device for producing duplicate magnetic patterns on a magnetizable copy medium from a magnetic pattern on a master magnetic record medium comprising a pair of air core coils connected in series aiding relation with an air gap therebetween for producing an electromagnetic transfer field across said air gap, means for supporting and clamping a master magnetic record medium and a magnetizable copy medium in assembled face-to-face engagement throughout the entire region of the magnetic pattern on said master magnetic record medium in said air gap and means for varying the intensity of the field produced by said coils.

11. A device for mass producing duplicate magnetic patterns on magnetizable copy media from magnetic patterns on master magnetic record media comprising means to produce an electromagnetic transfer field across an air gap between said coils, a rotatable turntable successive portions of which pass through said air gap when said turntable is rotated, means for rotating said turntable, means for depositing a master magnetic record medium and a magnetizable copy medium in assembled face-to-face engagement throughout the entire region of the magnetic pattern on said master magnetic record medium on said turntable and means for removing said assembled media from said turntable after the assembled media has passed through said air gap on said turntable.

References Cited in the file of this patent

UNITED STATES PATENTS

| | | |
|---|---|---|
| 2,747,026 | Camras | May 22, 1956 |
| 2,747,027 | Camras | May 22, 1956 |